April 8, 1947.  I. JACOBSON ET AL  2,418,714
PHOTOGRAPHIC SYNCHRONIZING EQUIPMENT
Filed June 22, 1944  3 Sheets-Sheet 1
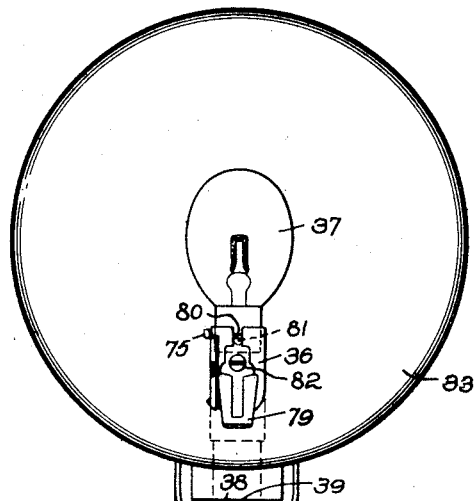
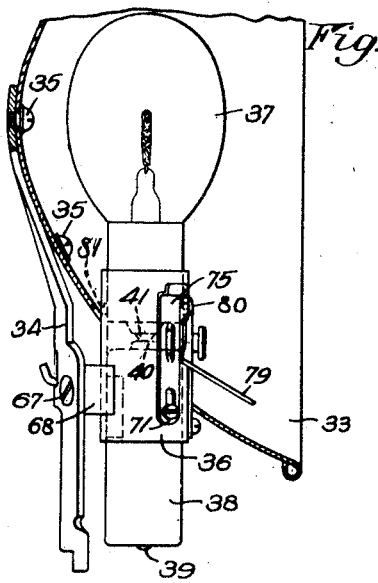
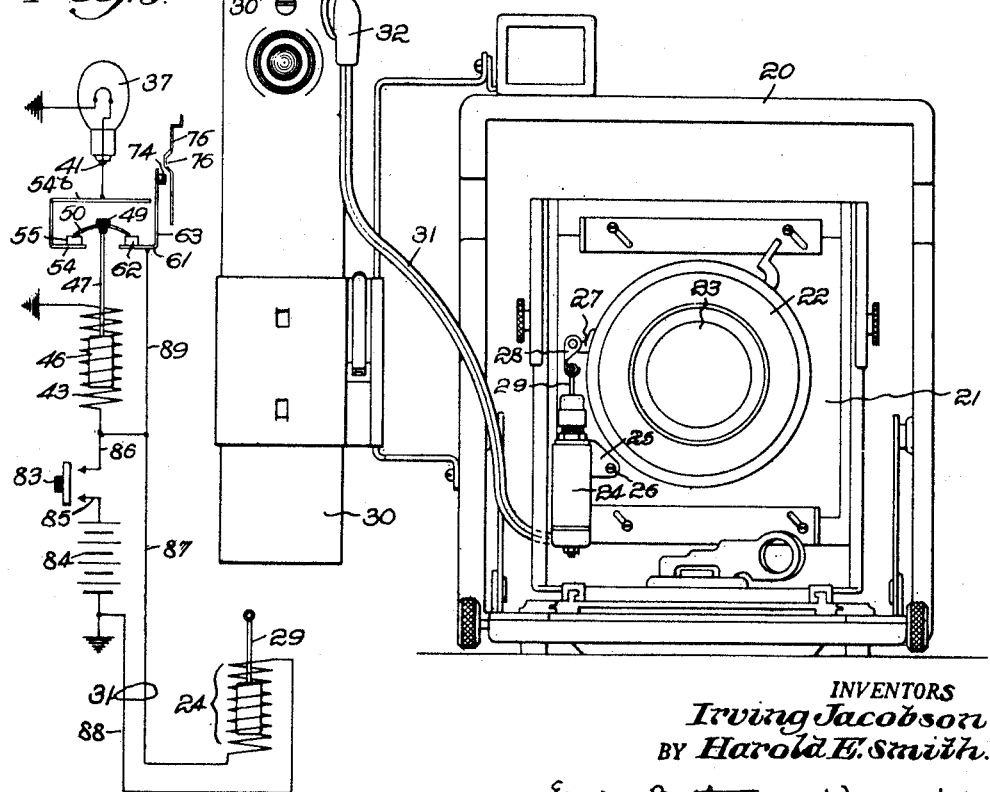
INVENTORS
Irving Jacobson
BY Harold E. Smith
Emery Booth Townsend Miller Whedon
ATT'YS.

April 8, 1947.  I. JACOBSON ET AL  2,418,714
PHOTOGRAPHIC SYNCHRONIZING EQUIPMENT
Filed June 22, 1944   3 Sheets-Sheet 2
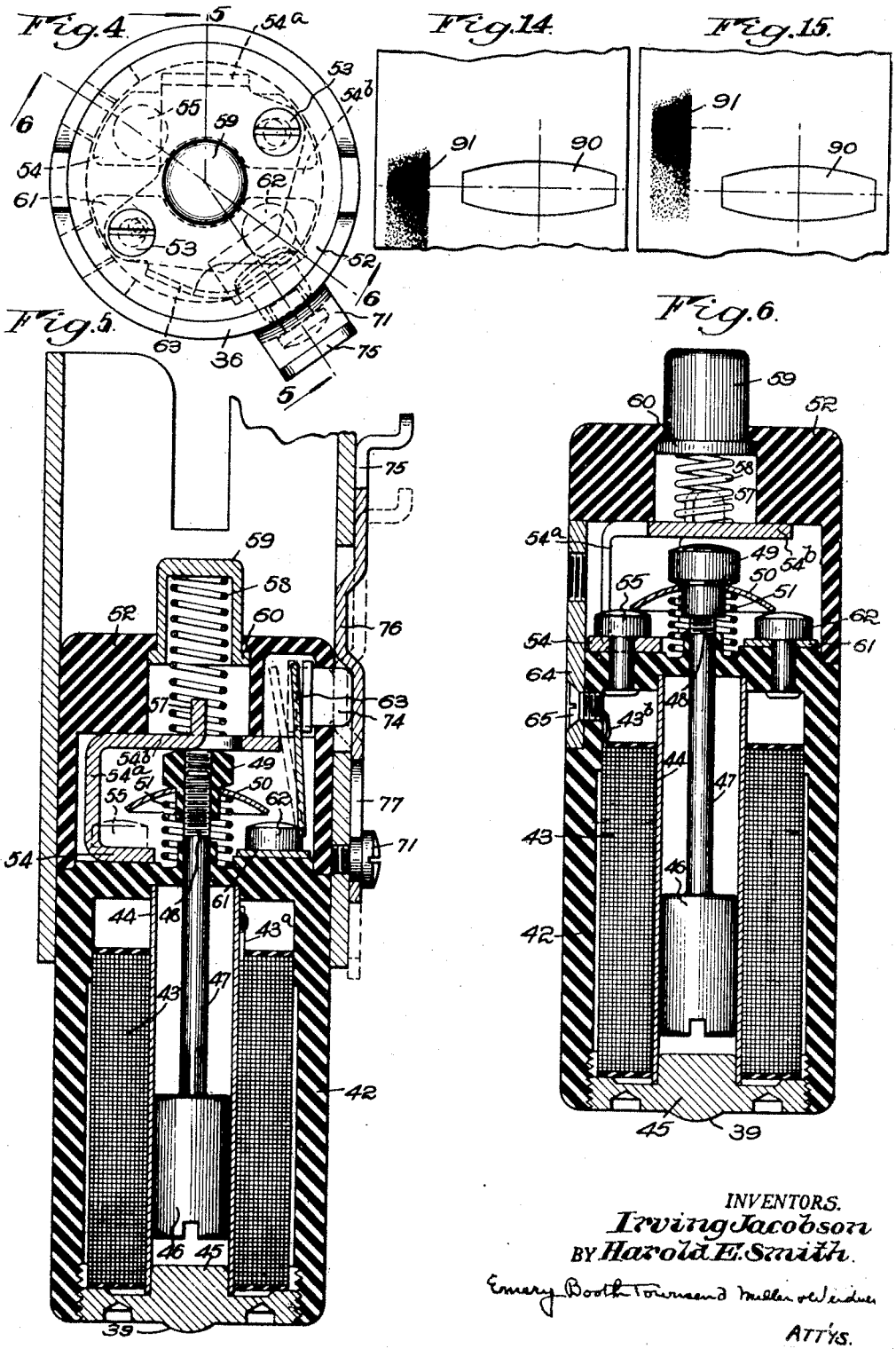
INVENTORS.
Irving Jacobson
BY Harold E. Smith
Emery, Booth, Townsend, Miller & Weidner
ATT'YS.

April 8, 1947.  I. JACOBSON ET AL  2,418,714
PHOTOGRAPHIC SYNCHRONIZING EQUIPMENT
Filed June 22, 1944  3 Sheets-Sheet 3

INVENTORS.
Irving Jacobson.
BY Harold E. Smith
Emery Booth Townsend Miller Whidden
ATT'YS.

Patented Apr. 8, 1947

2,418,714

UNITED STATES PATENT OFFICE 2,418,714

PHOTOGRAPHIC SYNCHRONIZING EQUIPMENT

Irving Jacobson, Hollywood, Calif., and Harold E. Smith, Rochester, N. Y., assignors to Graflex, Inc., Rochester, N. Y., a corporation of Delaware Application June 22, 1944, Serial No. 541,626

15 Claims. (Cl. 67—29)

1

This invention relates to photographic synchronizing equipments especially adapted for use with small-size flashlamps, which can be used for flashing lamps having fuses of the five-millisecond delay type or for flashing lamps having fuses of the twenty-millisecond delay type, whereby such lamps can be used interchangeably and either one can be properly timed with the usual magnetic tripper.

In order that the principle of the invention may be readily understood, we have disclosed a single embodiment thereof in the accompanying drawings, wherein—

Fig. 1 is a front elevation of a photographic camera to which is attached a battery case supporting a reflector having our invention applied thereto;

Fig. 2 is a detail in vertical section through the reflector, clearly showing the lamp socket with its time delaying means;

Fig. 3 is a circuit diagram of the time-delay mechanism, the battery, the electromagnetic tripper and the circuit to the flashlamp;

Fig. 4 is a top plan view of the lamp socket containing the time-delay mechanism, the reflector and the flash-lamp having been removed;

Fig. 5 is a vertical section on the line 5—5 of Fig. 4, showing the construction of the lamp socket and the time-controlling mechanism at a time when no current is flowing through the solenoid winding;

Fig. 6 is a vertical section on the line 6—6 of Fig. 4, being similar to Fig. 5, but showing the mechanism parts in condition to complete a circuit to the flashlamp, the solenoid coil being energized;

Figure 13:
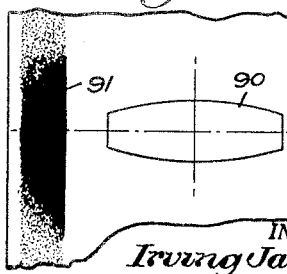
Fig. 13 is a diagram showing the relationship of the flash of a flashlamp to the opening of a shutter which has been synchronized by means of our invention, using the standard magnetic tripper and a flashlamp of the long-delay type of fuse, the delay-relay being shorted out.

Fig. 14 is a view similar to Fig. 13, but wherein a flashlamp having a short fuse delay is used and the time-delay relay is in circuit, thus causing perfect synchronization; and Fig. 15 is a view similar to Fig. 14 but shows the use of a flashlamp having a short time-delay and with the time-delay relay shorted out, but wherein the flashlamp fails to synchronize with the shutter opening of the camera.

The objects of the invention are: to provide a lamp socket having time-delay means in series with the flash-lamp to be ignited; to provide a lamp socket having time-delay means and switching means to render the time-delay means inoperative; to provide a lamp socket having time-delay means built into a reflector; to provide a lamp socket having time-delay means built into a reflector and that can readily be interchanged for a reflector of a larger size for use with the large flashlamps; to provide time-delay means of rugged construction but of a size that can readily be incorporated in the lamp socket usually receiving the miniature flashlamps; and to provide an adjustable relay for accurately timing the delay in an electrical circuit to the flashlamp.

Referring first to Figs. 1 and 2, wherein the invention is represented as applied to a Speed Graphic camera and Graflex battery case, such as shown in the patent to Oscar Steiner, No. 2,310,165, dated February 2, 1943, the camera is indicated generally at 20, the lens board thereof at 21, the between-the-lens shutter at 22, the lens at 23, and the magnetic tripper at 24, which is attached to the lens board by a bracket 25 and screw 26, and connected to the shutter release lever 27 by a hook member 28 and a connecting rod 29. The said magnetic tripper is electrically connected to the battery case 30 by an electric cable 31 having a plug 32 for insertion in a suitable socket in said battery case. The camera and the battery case may, however, be of any other suitable type, and our invention is shown as applied to a Speed Graphic camera merely for the purpose of exemplification and not by way of limitation.

To the battery case 30 is attached a reflector 33 by means of a bracket or support member 34 and screws 35, 35. Attached to the said reflector support member 34 is a lamp socket tube 36, the upper end whereof holds a flashlamp 37 and the lower end whereof is provided with a time-delay relay indicated generally at 38 and having a contact point 39. The upper end of the said relay is provided with a second contact 40 indicated in dotted lines in Fig. 2 and which makes contact with the flashlamp 37 through the lamp contact 41, also shown in dotted lines.

Referring particularly to Figs. 4, 5 and 6, wherein are shown, chiefly in vertical section, certain details of construction of the lamp socket tube or member 36 and of the time-delay relay 38, it will be observed that the time-delay relay 38 is provided with an outer housing 42 preferably of insulating material and carrying a magnetic winding 43 wound on a tube 44, both held in the housing 42 by a threaded plug 45. Fitted into the tube 44 is an armature 46 having a connecting rod 47, one end whereof is threaded as indicated at 48 and passes through a suitable hole in the housing 42. To the upper end of the said connecting rod 47 is attached an insulating knob 49 carrying a contact disk 50 and a coiled spring 51 is provided tending to move upward the rod 47 and contact disk 50.

Figure 10:
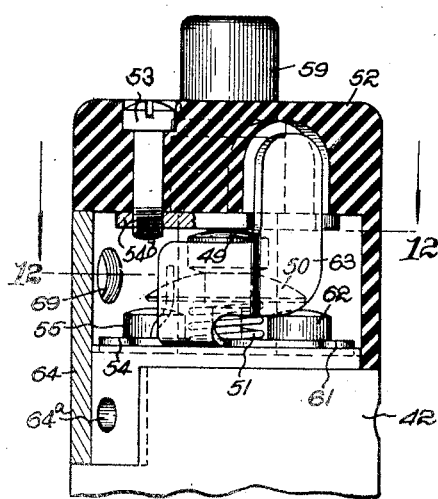
Fig. 10 is a partial vertical section through Fig. 8, showing the construction of the switch for shorting out the time-delay mechanism.
Figure 11:
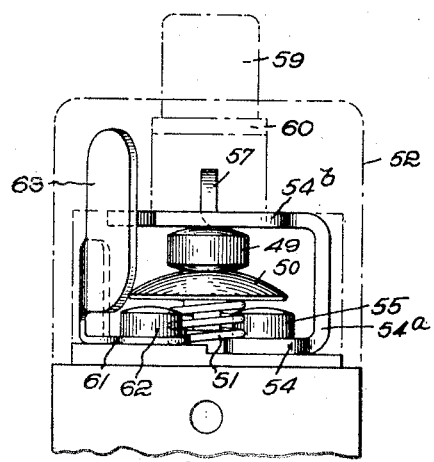
Fig. 11 is a view similar to Fig. 10, the cover being removed, and showing the construction of the relay switch, the cover and contact button being indicated in dotted lines.

The time-delay relay 38 is provided with an upper relay cover member indicated at 52 and connected to the housing 42 by screws 53, 53, best shown in Figs. 4 and 10. To the upper end of the housing 42, a plate 54 is attached by rivets 55 and 55a (Fig. 12), the construction of such plate being best shown in Figs. 5, 7, 11 and 12, from which it is evident that said plate is provided with a vertical connecting member 54a and a top horizontal member 54b, the latter being provided with tapped holes 56, 56, into which are threaded the screws 53, 53 passing through the upper relay cover member 52 and threaded into said plate 54. The upper member 54b of said plate 54 has an upwardly extending finger-like part 57 serving to center or hold in place a coiled contact spring 58 tending to cause the thimble-shaped contact member 59 to be moved upwardly. Such contact member 59 is fitted into a suitable opening in the said relay cover member 52 and is provided at its lower end with an outwardly extending annular shoulder 60 to limit the motion of said contact member 59 in an upward direction.

Figure 7:
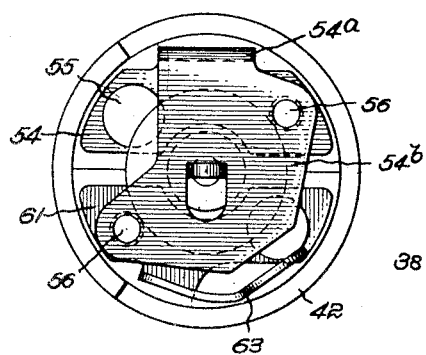
Fig. 7 is a top plan view of the time-delay mechanism, the top cover having been removed to show more clearly the construction of the said mechanism.
Figure 12:
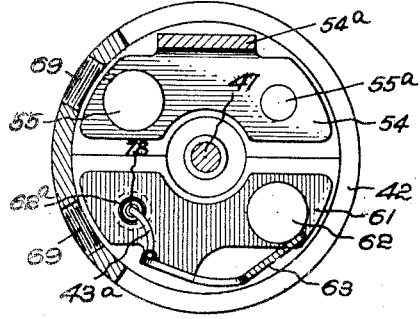
Fig. 12 is a transverse section through Fig. 10 on the line 12—12 thereof.

As shown particularly in Figs. 7 and 12 a second plate-like member 61 is attached to the upper end of the housing 42 by rivets 62, 62a, said plate-like member 61 being provided with an upwardly extending spring finger 63, best shown in Fig. 5, and the function whereof is duly set forth at a subsequent point.

Figure 8:
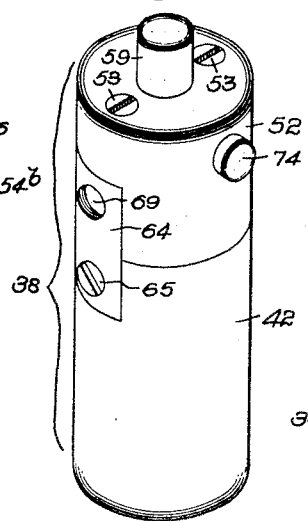
Fig. 8 is a detail in elevation of the time-delay mechanism removed from the lamp socket.

Referring particularly to Figs. 2 and 4, for the purpose of attaching the time-delay relay 38 to the socket tube or member 36, there is provided a semi-circular metallic plate 64 fitted, as shown in Figs. 8 and 10, into suitable recesses in the lower housing 42 and the upper housing or relay cover member 52. The said plate 64 is secured to the relay outer housing 42 by screws 65, 65 passing, as shown in Fig. 10, through holes 64a of the plate 64 and threaded into the relay outer housing 42.

Figure 9:
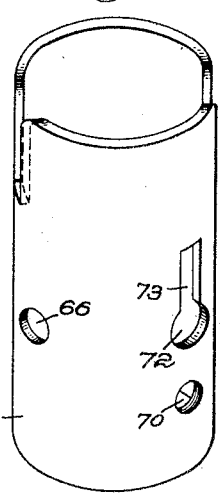
Fig. 9 is an elevation of the lamp socket tube with the time-delay mechanism removed.

The lamp socket tube or member 36 is provided with suitable holes, one of which is indicated at 66 in Fig. 9, and screws 67 (as shown respecting one of them in Fig. 2) pass through the reflector support bracket 34, the support bracket spacer 68, through the socket tube or member 36 and into the threaded openings 69 (Figs. 10 and 12) of the plate 64, thus securely holding the assembly together. The said socket tube or member 36 is provided, as shown in Fig. 9, with a threaded opening 70 to receive the shoulder screw 71, as shown in Figs. 4 and 5, and is also provided with an opening 72 and an elongated slot 73 extending therefrom, as shown in Fig. 9.

As shown in Fig. 5, the upper relay cover member 52 is provided with a hole into which is fitted an insulated button 74 engaging the finger 63, and it will be evident that when the button 74 is moved in a left-hand direction viewing Fig. 5, the said finger 63 will be caused to contact with the member 54b of the plate 54, thus electrically connecting the said plate 54 and member 61.

As best shown in Figs. 4 and 5, we have provided means for holding the button 74 in a position inward or to the left from that shown in full lines in Fig. 5. For that purpose we have provided, in this embodiment of the invention, a sliding plate member 75 having a depressed guide portion or part 76, best shown in Fig. 5 but shown also in Figs. 2 to 4. The said sliding plate member 75 is held to the socket member 36 by the screw 71, and when the said sliding plate member 75 has been moved by the operator to its limit in a downward direction as controlled by the elongated slotted opening 77 therein, the said inwardly extending portion 76 will move the button 74 to the left viewing Fig. 5, thereby deflecting the said spring member 63 so as to cause an electrical connection or contact between the plate 54b and the plate-like member 61, as indicated in dotted lines in Fig. 5.

Referring particularly to Figs. 6 and 12, the solenoid coil 43 has its inner end 43a connected to the solenoid tube 44 and such wire end extends up through the hole 78 of rivet 62a, as shown in Fig. 12, and is electrically connected to the plate-like member 61, as indicated in said Fig. 12.

The opposite or outer end of the solenoid coil 43 is connected, as shown in Fig. 6, to the screw 65, as indicated in Fig. 6. This construction grounds one end of the solenoid winding 43 to the mounting plate 64 which in turn is grounded to the socket tube or member 36, reflector support 34 and battery case 30.

The operation of the invention herein disclosed is as follows, reference being made particularly to Figs. 1, 3, 5 to 7, 10 and 11.

The reflector 33, carrying the socket tube or member 36 and time-delay relay 38 and bracket 34, is mounted on the battery case 30. The contact 39 of the time-delay relay 38 will then make contact with the battery case central contact 30a, Fig. 1. A flashlamp 37 is inserted in the socket tube or member 36, and is retained therein by a suitable lamp retaining latch 79 provided with a hook 80 for engaging one of the lamp base pins 81, such latch being held to the socket tube or member 36 by a screw 82, as shown in Fig. 1.

It will be assumed that there has just been positioned in the socket tube or member 36 a flashlamp having a short-time delay fuse (that is, one having a delay of approximately five milliseconds) and that the sliding plate member 75 is in the full line position shown in Figs. 3 and 5. Thereupon the switch 83 (Fig. 3) is operated thereby, closing a circuit from the battery 84 through wire 85, wire 86, wire 87 to solenoid 24, constituting the shutter operating tripper, through wire 88 and thence to ground. A circuit will also be completed through the wire 86, solenoid windings 43 and to ground. A circuit is also completed to wire 89 that connects with the plate-like member 61 carrying the contact 62. The tripper 24 will thereupon be energized, and connecting rod 29 will be caused to move in a downwardly direction, carrying with it link 29 and shutter release lever 27, thus operating the between-the-lens shutter 22. The solenoid winding 43 (Figs. 6 and 7) will also be energized causing the armature 46, the shaft 47, insulating bushing 49 and contact disk 50 to move downward, completing a circuit between the contact 62, contact 55, member 54, spring 58, contact button 59 to flashlamp 37 and thence to ground. The spring finger 63 tends to return to its position shown in full lines in Fig. 5.

Since the shutter operating relay 24 is normally adjusted to provide a twenty millisecond ignition delay, which corresponds to the ignition delay in the most common type of flashlamp, it is necessary to introduce a further delay to the lamp having a short-time ignition delay, which approximates a delay of five milliseconds. Therefore, the time-delay relay 38 requires approximately fifteen milliseconds to complete a circuit through the contact 62 to contact 55 (Fig. 3), thus providing a total delay of twenty milliseconds for the flashing of the flashlamp 37. That is, the delay introduced by the operation of the time-delay relay 38 is added to the ignition delay of the lamp 37, and this total delay equals the time delay of the standard flashlamp, for which most of the magnetic trippers are designed, as is the case of the magnetic tripper solenoid 24, shown in Fig. 1.

If the sliding plate member 75 is moved by the operator in a downward direction into the position shown in dotted lines in Fig. 5, the contacts 55 and 62 are connected together through finger 63 in the manner previously described. In such condition or position of the parts, the flashlamp bulb having a standard delay (that is, a delay of twenty milliseconds) can be used instead of the flashlamp having a short delay, since there is now no added delay introduced into the circuit.

The disclosed construction provides means for using interchangeably flashlamps of either the short-time delay or the so-called standard time-delay fuse, with the shutter that is operated by a magnetic tripper.

We believe that we are the first to provide such a device or mechanism, and it will readily be understood that if the unit consisting of the reflector 33 (shown in Figs. 1 and 2) carrying with it the lamp socket tube or member 36 and the time-delay relay 38 are removed and the standard reflector be substituted therefor, the large flashlamps having a standard time delay of twenty milliseconds can also be used. However, when using the small flashlamp, it is always desirable to use a reflector designed for such small lamp. Since the small lamps are manufactured having both the short and the standard time delay, it will be understood that we have hereby provided very simple means for using either of these lamps in the standard equipment.

In Figs. 13, 14 and 15, there are shown test charts as made in a device for testing the synchronization of photoflash lamps with between-the-lens shutters. Therein the shutter opening is indicated at 90 and the shaded area 91 represents the flashlamp illumination.

In Fig. 13 the position and extent of the shaded area 91 indicate that the synchronizer is being used with a lamp having a long duration of flash and that such lamp has also a long fuse or time delay.

In Fig. 14, the position and extent of the shaded area 91 indicate that there is being used a lamp having a short flash duration and a short fuse or time delay. Proper synchronization is indicated in both Figs. 13 and 14.

In Fig. 15, the position and extent of the shaded area 91 indicate that there is being used a lamp of the short fuse or time delay, and indicate the results that would be obtained without the use of our invention when such a flashlamp is used in connection with a synchronizer having a magnetic tripper.

While we have herein shown our invention as applied to a synchronizer battery case and magnetic tripper of the Graflex type and manufacture, it will be readily understood that our invention can also be applied to a number of other types of flashlamp battery cases, such as the Mendelsohn synchronizer having a battery case and a magnetic tripper. The representation herein of the Graflex type is by way of exemplification only and not for purposes of limitation.

It will be understood that the time-delay relay can be adjusted to modify slightly the time cycle. This is done by changing the position of the insulating knob 49 on the connecting rod 47, thus changing the position of the armature 46 with relation to the solenoid winding 43, thereby making it possible to adjust the time delay through a sufficient degree or extent to provide any adjustment necessary to operate with any magnetic tripper known to us.

Our invention is clearly distinguished from that of the patent to Oscar Steiner, No. 2,350,258, May 30, 1944, which is for the same general purpose, but wherein, in order to use in the synchronizer equipment a photoflash bulb of very short ignition delay in substitution for a photoflash bulb of a substantially longer ignition-delay, it is necessary to insert into the synchronizer equipment a unit including not only the very short-ignition delay bulb and the reflector therefor, but certain circuiting means so as to use an auxiliary switch constituting delay means and having a movable part for operatively connecting it to the operated part of the electromagnetic operator of the basic synchronizer equipment. In accordance with our invention it is merely necessary to substitute the shorter time-delay bulb with preferably the special reflector and to move the slidable plate member 75 so as to bring into circuit the time-delay relay 38.

In our invention there is provided a relay which is in series with a flashlamp having a short time-delay. Such relay provides an additional time factor which is added to the delay of the SM lamp, making the total delay equal the delay of the standard flashlamp, thus making it possible to use the regular tripper without any adjustments, for firing the short duration lamps or the long duration lamps interchangeably, means being provided for short-circuiting the time-delay relay so that lamps having a long delay can be employed in the same socket.

It is to be understood that while only a between-the-lens shutter is shown in the drawings hereof, a focal plane shutter may be used in addition, or alone, and that the magnetic tripper of whatever type, and constituting an electromagnetic operator, may be connected up as fully disclosed in the said patent to Steiner, No. 2,329,011, (to which reference is made for full explanation) so as to make photoflash exposures in any desired way, as by the three methods therein referred to (page 5, column 2), namely, (1) the open and shut method, wherein the camera shutter is set at bulb exposure, or (2) the method wherein the focal plane shutter alone is employed, or (3) the method wherein the electromagnetic tripper is employed for operating the front or between-the-lens shutter in taking instantaneous exposure pictures.

Having thus described one illustrative embodiment of the invention, it is to be understood that although specific terms are employed, they are used in a generic and descriptive sense and not for purposes of limitation, the scope of the invention being set forth in the following claims.

We claim:

1. In a photographic flash synchronizer equipment for use with a camera having a casing provided with a shutter, a battery case having battery means and having a photoflash lamp socket to support a flashlamp of either a very short-ignition-delay photoflash bulb type, and having means for attaching said battery case to the camera casing; electric circuiting means operatively connecting the battery in the battery case to the flashlamp, an electromagnetic operator in the said circuiting means which is operatively connected to a shutter of said camera, said circuiting means including a time-delay relay supported directly at the said photoflash lamp socket, said time delay relay having contacts and thus constituting a unit with said socket, said contacts being in series with the flashlamp when using a short-time ignition delay, and means at said photoflash lamp socket for short-circuiting the said time-delay relay, so that a photoflash lamp having a long-time ignition delay can be fired instead in the same lamp socket.

2. As an article of manufacture and sale for use in a photographic flash synchronizer equipment as a unit assembly readily detachable from the rest of the equipment, a lamp socket for a photoflash lamp of either a very short ignition delay type or a longer ignition delay type, the said socket having thereat and directly attached thereto, so as to constitute a unit therewith and so as to constitute a unitary part of said article of manufacture, time-delay means having contacts, and electric circuiting means between said time delay means and the photoflash lamp, placing the said contacts of said time delay means in series with the flashlamp, so as to use in proper timing the very short ignition delay type of flashlamp in the said socket, said electric circuiting means having therein an electromagnetic operator operatively connected to a shutter of a camera with which said equipment is to be used.

3. An article of manufacture in accordance with claim 2, but wherein the time-delay means comprises a housing 42 and a cover 52 for said housing, the said cover being directly mounted in the socket tube, and a solenoid constituting the time-delay means and mounted within said housing.

4. An article of manufacture in accordance with claim 2, but wherein the time-delay means comprises a housing 42 and a cover 52 for said housing, the said cover being directly mounted in the socket tube, and a solenoid constituting the time-delay means and mounted within said housing, there being between the housing 42 and its cover 52 a contact plate 54 and contact member 61 and means at said socket for shortening-out said solenoid and establishing contact between said plate 54 and member 61, said means for establishing contact consisting of the movably mounted contact-making finger 63 on the plate 54, a member 75 movable by the operator and positioned at said socket to cause the finger 63 to move and thereby make contact between the member 61 and the plate 54 and shorting-out said solenoid, and the insulated button 74 moved inward by said member 75 to engage the movably mounted finger 63 so as to make said contact between the plate 61 and the plate 54.

5. As an article of manufacture and sale for use in a photographic flash synchronizer equipment that has a battery case to be attached to the camera so as to be hand-held therewith, a lamp socket for a photoflash lamp of either a very short ignition delay type or a longer ignition delay type to be supported by said battery case, the said photoflash lamp socket supported by the battery case having thereat and directly attached thereto so as to constitute a unit therewith and so as to constitute a unitary part of said article of manufacture, time-delay means and electric circuiting means placing said time-delay means in series with the flashlamp, so as to use in proper timing the very short ignition delay type of flashlamp in the said socket, said time-delay means including a tubular housing 42 and a top tubular cover 52 therefor, means for securing said housing and cover within said socket, a solenoid winding within said housing, a solenoid core having a rod extending axially therefrom, a contact plate and a contact member between said housing and said cover, and a contact disk-like part upon said solenoid core rod, so positioned that upon energization of said solenoid the said core rod is moved axially to complete the circuit through said contact plate and contact member, said electric circuiting means having therein an electromagnetic operator operatively connected to a shutter of a camera with which said equipment is to be used.

6. As an article of manufacture, a relay and casing therefor of a size and shape to be received telescopically by a lamp socket tube, said relay and casing therefor comprising; a relay housing, a cover for the upper end of the housing and which cover is adapted to be directly and telescopically received by a lamp socket tube, a magnetic winding and armature received within said housing, said armature having a connecting rod with a spring actuated contact member, the upper end of said housing having a plate, said plate having an electrical contact and also having an upward projection provided with a transversely extending top member within said cover, said transversely extending top member having contact provisions for the use of the relay, a second plate electrically connected to said magnetic winding and with an electrical contact in said housing and provided with an upwardly extending member adapted to be moved into electrical contact with said transversely extending top member, and an insulated button-like member operable from the exterior of the housing for the purpose of establishing or breaking contact between said first and second plates at the upper end of said relay housing.

7. A relay and casing therefor in accordance with claim 6, but wherein the said housing cover is provided with an opening to receive a spring actuated contact member movable upwardly for electrical engagement with the lamp.

8. A relay and casing therefor in accordance with claim 6, but wherein the connecting rod of the armature is provided with an insulating adjustable knob.

9. A relay and casing therefor in accordance with claim 6, but wherein the connecting rod of the armature is provided with an insulating adjustable knob, and also with a contact disk and a coil spring together constituting the said spring actuated contact member and tending to move said connecting rod and said contact disk in one direction axially of said rod.

10. A relay and casing therefor in accordance with claim 6, but wherein the said cover and the housing, for the purpose of attaching the relay and cover to a lamp socket tube, are provided in the wall thereof with a metallic plate attached to said cover and relay housing and having provisions for securing the same to the lamp socket tube and electrically connected to the magnetic winding of the relay.

11. A relay and casing therefor in accordance with claim 6, but wherein the said cover and the housing, for the purpose of attaching the relay and cover to a lamp socket tube, are provided in the wall thereof with a metallic plate attached to said cover and relay housing and having provisions for securing the same to the lamp socket tube and electrically connected to the magnetic winding, such provisions including a screw adapted also to engage a sliding plate member, which latter is manually movable to render the relay operative or inoperative.

12. As a new article of manufacture and sale, a unit assembly for use in a photographic flashlamp equipment, said unit assembly comprising a photoflash lamp socket tube to receive at its upper end a flash lamp of short time delay, the lower end of said tube having attached directly thereto a time-delay relay having contact points at its upper and lower end portions for making contact respectively with the said flashlamp and with the battery in the usual battery case of the equipment to place the relay in series with the flashlamp.

13. As a new article of manufacture and sale, a unit assembly for use in a photographic flashlamp equipment said unit assembly comprising a photoflash lamp socket tube to receive at its upper end a flashlamp of short time delay, a bracket-like support member attached to said tube, a reflector attached to the upper portion of said support member, the lower end of the said tube having a time-delay relay provided with a housing telescopically attached directly to said tube, said relay having contact points at its upper and lower ends for making contact respectively with the flashlamp and with the battery in the usual battery case of the equipment, to place the said relay in series with the said flashlamp.

14. As a new article of manufacture and sale, a unit assembly for use in a photographic flashlamp equipment, said unit assembly comprising a photoflash lamp socket tube to receive at its upper end a flashlamp having a short time delay of approximately five milliseconds, the lower end of said tube having attached directly thereto a time-delay relay requiring approximately fifteen milliseconds to complete a circuit, so that the delay introduced by the operation of the time-delay relay added to the ignition delay of the short time delay flashlamp equals the time delay of the so-called standard flashlamp for which most magnetic trippers of a flashlamp photographic equipment are designed, so that there can be used interchangeably in a flashlamp photographic equipment, flashlamps of such short time delay or the so-called standard time delay.

15. As an article of manufacture and sale for use in a photographic flashlamp equipment of the type having a battery case to be attached to the camera, so as to be hand-held therewith, a detachable lamp socket for use with a photoflash lamp that is supported by said battery case, said detachable lamp having a very short ignition delay, the said detachable socket having directly built thereonto, so as to constitute a unitary part of said article of manufacture, time delay means consisting of a relay with contacts and electric circuiting means placing said contacts of said time delay means in series with the said flashlamp, so as to use in proper timing the very short ignition delay type of flashlamp in said socket.

IRVING JACOBSON.
HAROLD E. SMITH.

REFERENCES CITED

The following references are of record in the file of this patent:

UNITED STATES PATENTS

| Number | Name | Date |
| --- | --- | --- |
| 2,324,075 | Gillon | July 13, 1943 |
| 2,293,477 | Steiner | Aug. 18, 1942 |
| 2,161,355 | Jacobson | June 6, 1939 |